May 31, 1966  E. S. STEIN  3,253,680
WHEEL TREAD BRAKE ARRANGEMENT
Filed April 20, 1964  2 Sheets-Sheet 2
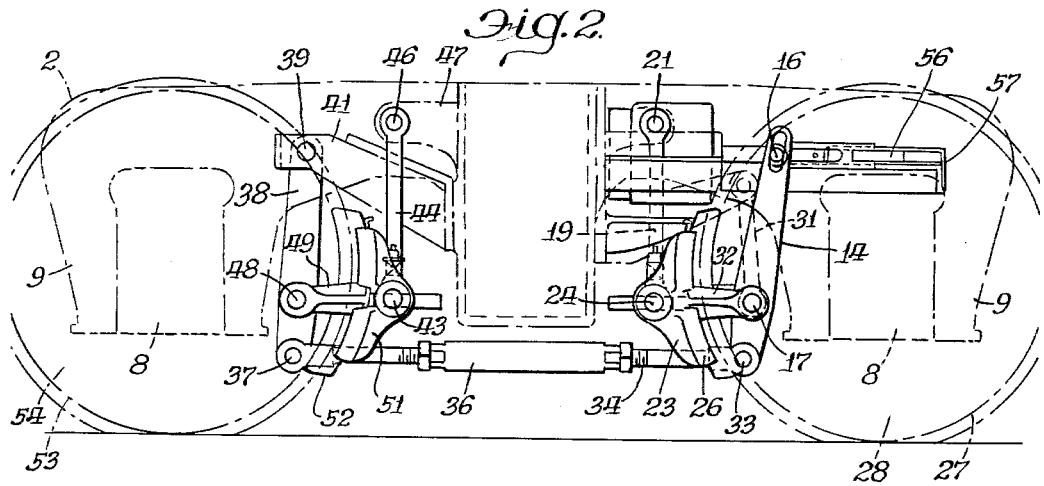
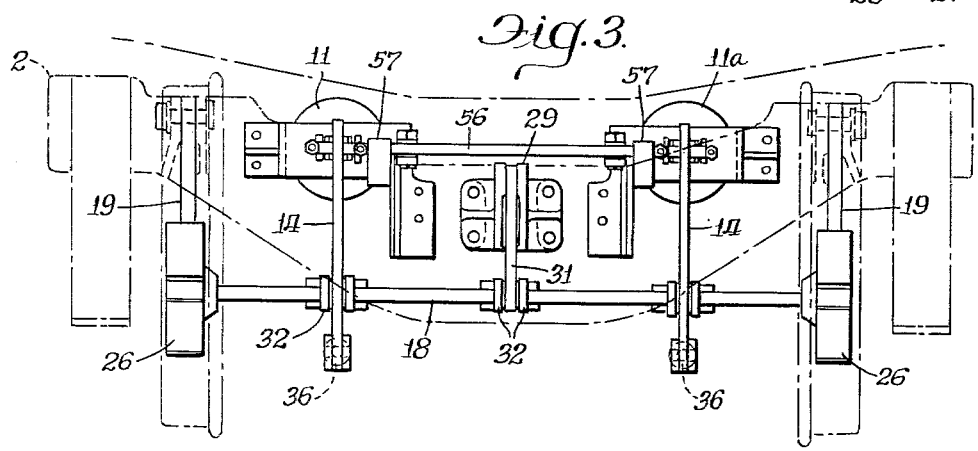
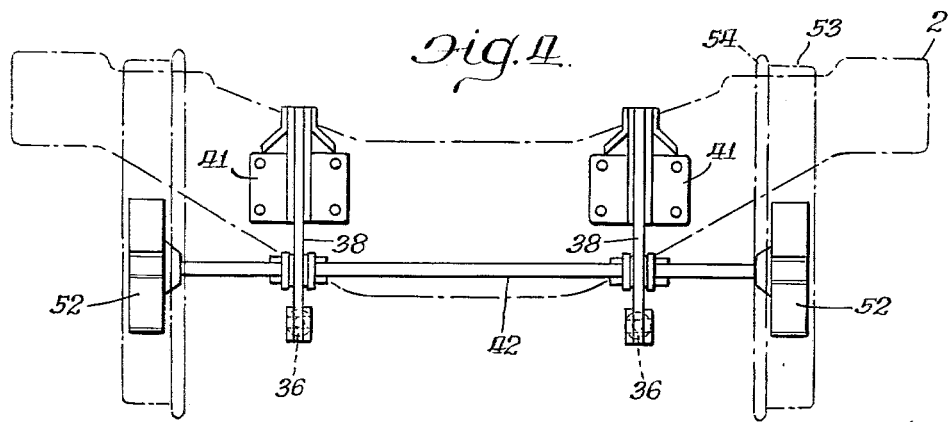
Inventor:
Eugene Steve Stein
By Walter L. Schlegel Jr
Atty.

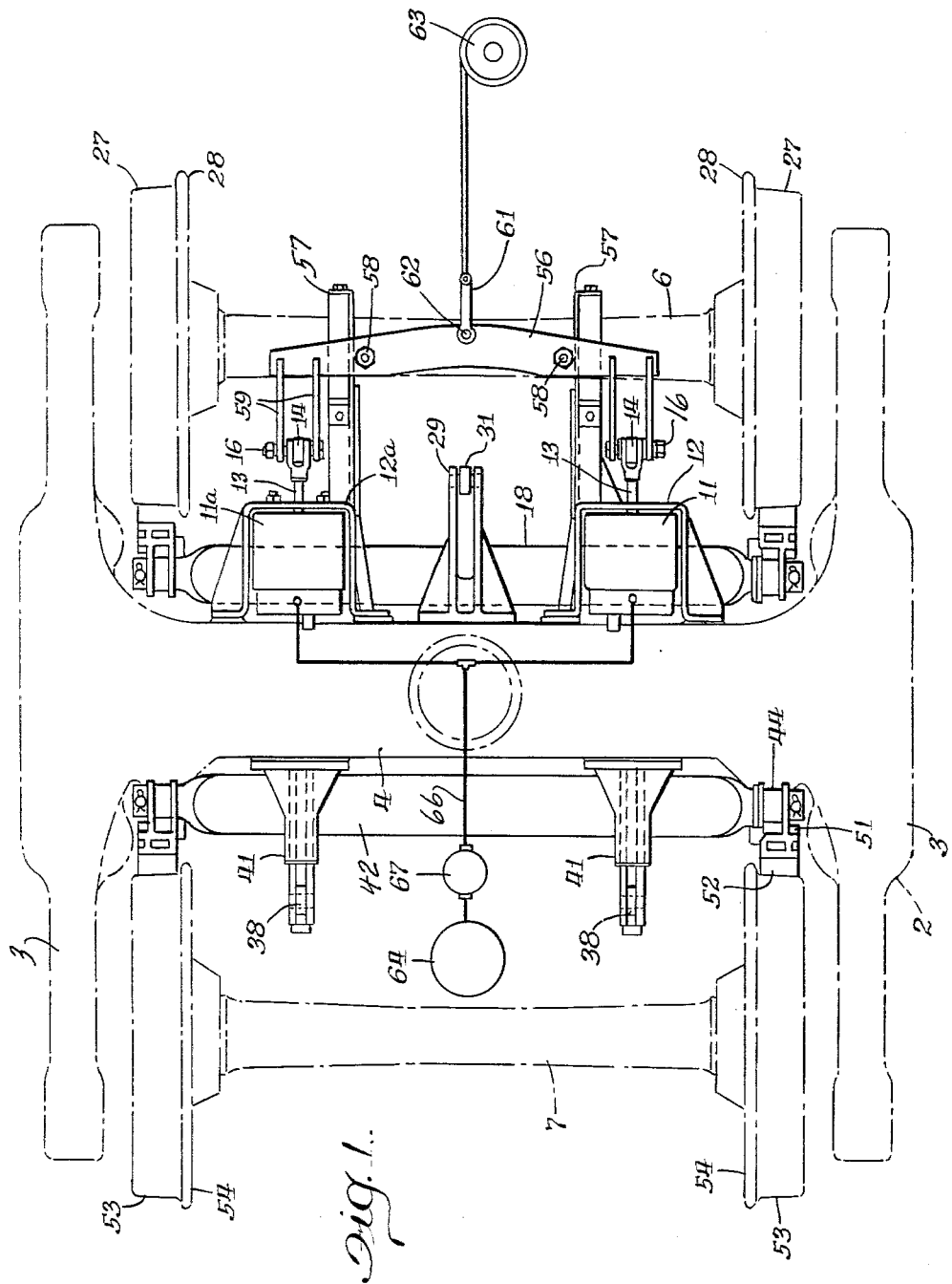

United States Patent Office 3,253,680
Patented May 31, 1966

3,253,680
WHEEL TREAD BRAKE ARRANGEMENT
Eugene Steve Stein, Lansing, Ill., assignor to Amsted Industries Incorporated, Chicago, Ill., a corporation of New Jersey
Filed Apr. 20, 1964, Ser. No. 361,181
3 Claims. (Cl. 188—52)

This invention relates to a brake arrangement for a four wheel railway car truck and more particularly to a single shoe tread brake arrangement adapted for use on rapid transit passenger cars.

Briefly, the present invention contemplates the provision of a four wheel tread brake arrangement comprising a pair of brake beams pivotally suspended from the truck frame by means of brake hangers. Brake head shoe assemblies are secured on the ends of their respective brake beams between the wheel and axle assemblies for movement into and out of frictional engagement with their respective wheel tread surfaces. A pair of power cylinders secured to the transom of the truck frame acts through live brake levers, push rods, and dead brake levers to move the brake head shoe assemblies against the wheel tread surfaces. For manual operation, the upper ends of the live brake levers are interconnected by an equalizer slidably supported on guides and actuated by a pull rod connected to a conventional manual brake operator.

An object of the invention resides in the provision of a single shoe tread brake arrangement which is relatively inexpensive in construction and reliable in operation.

Another object of the invention resides in the provision of a single shoe tread brake arrangement in which two power cylinders are mounted on a truck frame transom and act through live brake levers, push rods, and dead brake levers to move two brake beams toward their respective wheel and axle assemblies, the brake beams being pivotally supported at their ends upon brake hangers depending from the truck frame and provided with brake head shoe assemblies to engage the tread surfaces of their respective wheels.

The invention embodies other novel features, details of construction, and arrangement or parts which are hereinafter set forth in the specification and claims and illustrated in the accompanying drawings, forming part thereof, wherein:

FIGURE 1 is a top plan view illustrating a four-wheel railway car truck provided with a single shoe tread brake arrangement embodying features of the invention.

FIGURE 2 is a side elevation of the structure illustrated in FIGURE 1.

FIGURES 3 is an end elevation illustrating the truck and brake arrangement.

FIGURE 4 is an end elevation showing the opposite end of the truck and brake arrangement.

Referring now to the drawings for a better understanding of the invention, the brake arrangement is shown as mounted upon a four-wheel rapid transit truck comprising a one-piece frame 2 having side rails 3 interconnected by a transom 4. Wheel and axle assemblies 6 and 7 are journaled at their ends in journal boxes 8 mounted between pedestal jaws 9 on the side rails 3.

The single shoe tread brake arrangement is shown as comprising two power cylinders 11 and 11a secured to one side of the transom 4 by means of mounting brackets 12 and 12a, respectively. Each power cylinder is provided with a piston rod 13 pivotally connected at its outer end to the upper end of a live brake lever 14 by means of a bolt 16.

Each live brake lever is pivotally connected intermediate its ends at 17 to a live lever brake beam 18 which is pivotally supported at its ends upon the lower ends of a pair of brake hangers 19 pivotally suspended at 21 from the truck frame 2. Brake heads 23 are journaled at 24 on opposite ends of the brake beam 18 and provided with brake shoes 26 adapted to frictionally engage the tread surfaces 27 of their respective wheels 28. A balance hanger bracket 29 is mounted on one side of the transom 4 for pivotal engagement with the upper end of a balance hanger 31 which is pivotally connected at its lower end between a pair of arms 32 secured to the brake beam 18.

The lower ends of the live brake levers 14 are pivotally connected at 33 to push rods 34 provided intermediate their ends with slack adjusters 36. The push rods 34 are pivotally connected at 37 to the lower ends of dead brake levers 38 which are pivotally suspended at 39 to brackets 41 secured to the transom 4. A dead lever brake beam 42 is pivotally supported adjacent its ends at 43 upon the lower ends of brake hangers 44 which are pivotally connected at their upper ends at 46 to arms 47 provided on the transom 4. The dead brake levers 38 are pivotally connected at 48 to the end of arms 49 secured to the brake beam 42.

Brake heads 51 are journaled on the ends of the brake beam 42 and provided with brake shoes 52 to frictionally engage the tread surfaces 53 of their respective wheels 54.

A handbrake equalizer member 56 is slidably supported for horizontal movement upon spaced guides 57 extending outwardly from the transom 4, the equalizer member being provided with rollers 58 for rolling engagement along the inner sides of the guides 57. Spaced arms 59 are provided on each end of the equalizer member 56 for pivotal engagement with the upper ends of the live brake levers 14 by means of the bolts 16. A handbrake pull rod 61 is secured at one end thereof at 62 to equalizer member 56, the opposite end of the pull rod being connected to a conventional manually operable handbrake device 63.

In the operation of the single shoe tread brake arrangement thus shown and described, fluid under pressure is supplied from a suitable source 64 through a conduit 66 to the power cylinders 11 and 11a under control of a suitable valve 67 to cause the piston rods 13 to move outwardly from their respective power cylinders. The piston rods act through their respective live brake levers 14 and brake beam 18 to move the brake shoes 26 into frictional engagement with the tread surfaces 27 on the wheels 28. The live brake levers 14 also act through their respective push rods 34 to move the brake beam 42 toward the wheel and axle assembly 7 to frictionally engage the brake shoes 52 against the tread surfaces 53 on the wheels 54.

I claim:
1. In a tread brake arrangement for a four wheel railway car truck having spaced wheel and axle assemblies supporting a one-piece truck frame having side rails interconnected by a transom, two brake beams pivotally suspended from opposite sides of the truck frame transom, brake head-shoe assemblies journaled on the ends of said beams for braking engagement with said wheels, two power cylinders secured to one side of the truck transom, piston rods projecting in a common direction from the cylinders, two live brake levers connected at their upper ends to said piston rods and pivotally connected intermediate their ends to one of said brake beams, two dead brake levers pivotally suspended from said transom and pivotally connected intermediate their ends to the other of said brake beams, and push rods connecting the lower ends of the live brake levers to the lower ends of the dead brake levers.

2. A brake arrangement according to claim 1 in which a balance hanger is pivotally suspended from the transom and pivotally connected at its lower end to said one brake beam.

3. A brake arrangement according to claim 2 in which an equalizer member is pivotally connected at its ends to the upper ends of said live brake levers, spaced guides secured to the transom to slidably support said member, and manually operable means to actuate said member.

References Cited by the Examiner

UNITED STATES PATENTS

| | | | |
|---|---|---|---|
| 2,181,041 | 11/1939 | Baselt | 188—52 |
| 2,243,534 | 5/1941 | Mussey | 188—52 X |

FOREIGN PATENTS

| | | |
|---|---|---|
| 396,694 | 8/1933 | Great Britain. |

DUANE A. REGER, *Primary Examiner.*